United States Patent

Fukuoka

[11] Patent Number: 5,810,899
[45] Date of Patent: Sep. 22, 1998

[54] GLASS PRODUCTION

[75] Inventor: Morinao Fukuoka, Sagamihara, Japan

[73] Assignee: Olympus Optical Co., Ltd., Tokyo, Japan

[21] Appl. No.: 825,921

[22] Filed: Apr. 2, 1997

[30] Foreign Application Priority Data

Jun. 11, 1996 [JP] Japan ..................................... 8-149345

[51] Int. Cl.⁶ ............................ C03B 37/016; C03B 8/00
[52] U.S. Cl. .................................. 65/17.2; 65/440; 501/12
[58] Field of Search ........................ 65/17.2, 440; 501/12

[56] References Cited

FOREIGN PATENT DOCUMENTS

| 61-44727 | 3/1986 | Japan . |
|---|---|---|
| 2-64032 | 3/1990 | Japan . |
| 92-002622 | 1/1992 | Japan . |
| 92-002624 | 1/1992 | Japan . |

*Primary Examiner*—Peter Chin
*Assistant Examiner*—Jacqueline A. Ruller
*Attorney, Agent, or Firm*—Cushman Darby & Cushman IP Group of Pillsbury Madison & Sutro LLP

[57] ABSTRACT

A glass with no stria form of defects induced therein is produced by a sol-gel technique. At a sol gelation step, the gelation temperature is maintained constant within the range of ±7° C. with respect to the temperature of a sol as charged in a gelation vessel, and the sol is gelated at a constant colloidal particle diameter with no vibrations applied thereto.

7 Claims, No Drawings

GLASS PRODUCTION

BACKGROUND OF THE INVENTION

1. Field of the Invention

The present invention relates to a process for producing glasses, especially optical glasses by sol-gel techniques.

2. Description of the Related Art

Glasses, and ceramics using porous materials as intermediates have been produced by sol-gel techniques wherein, for instance, metal alkoxides, water glasses, and particles of oxides such as $SiO_2$ are used as raw materials. According to the sol-gel techniques, wet gel porous materials are prepared, dried, and fired to obtain porous or intimate glasses or ceramics.

Glasses produced to date by the sol-gel techniques are often found to have a stria form of defects that are detrimental to the quality of the optical glasses. For instance, JP(A) 61044727 discloses the practice of steps of gelating a sol by heating the gel at a temperature lower than the boiling point of a solvent, and drying the resulting gel material by heating the gel at a temperature lower than the boiling point of the solvent until the gel material peels off the wall surface of a vessel, thereby preventing destruction or breakdown of the gel due to its volume shrinkage during gelation. However, the gelation of the sol by heating at temperatures close to the boiling point has very often resulted in a stria form of defects.

JP(A) 2064032 discloses a method of gelating a sol at 20° C. or lower to produce a homogeneous gel material by reducing the post-gelation rate of shrinkage. Even with this method, however, striae occur, for instance, when the sol is kept at some high temperature due to the generation of heat by hydrolysis reactions. This is because a large difference between the sol temperature and the gelation temperature causes the sol to flow due to convection. Thus, in the method of JP(A) 2064032, which involves only the application of the gelation temperature of 20° C. or lower, it is impossible to eliminate or reduce striae.

A primary object of the present invention is to provide a method for producing a glass free from a stria form of defects by a sol-gel technique, and a specific object of the present invention is to eliminate factors responsible for a stria form of defects which may otherwise occur at a sol gelation step.

SUMMARY OF THE INVENTION

According to the present invention, the aforesaid objects are achieved by the provision of a method for producing a glass by a sol-gel technique, wherein a sol is gelated at a temperature within a range of ±7° C. with respect to a temperature at which the sol is charged in a gelation vessel, thereby preventing the introduction of a density distribution in the sol. In this method, a difference between a temperature of the sol as charged in the gelation vessel and a temperature of the gelation vessel is kept within a range of ±7° C. Also after the charging of the sol in the gelation vessel, the sol is gelated with no vibration applied thereto.

DESCRIPTION OF THE PREFERRED EMBODIMENT

The inventors made intensive studies of why a stria form of defects are found in glasses produced by conventional methods, and have consequently indentified the cause of such defects. That is, the cause of a stria form of defects induced in the glasses has been found to be present in the step of forming a gel from a sol. When a sol having a non-uniform density distribution is gelled, the density of colloidal particles differs locally throughout the sol, and so the rates of aggregation and polymerization of the sol differ locally. This in turn causes the skeleton of the gel formed of the sol to become locally coarse. It has now been found that a stria form of defects ascribable to a minute composition distribution are induced in a final product or glass obtained by the drying, and firing of this gel.

A density difference is induced in the sol for various reasons, among which there are two leading reasons, one being a temperature difference across the sol, and the other being vibrations applied to the sol at the gelation step following the charging of the sol in a vessel.

A temperature difference across the sol gives rise to a density distribution across the sol, and causes convection. The rates of aggregation and polymerization of a high-temperature sol portion become high, whereas the rates of aggregation and polymerization of a low-temperature sol portion become low. Consequently, a density distribution is induced in the skeleton of the gel formed, yielding a final product or glass having a stria form of defects ascribable to a minute composition distribution.

Unless a temperature difference is eliminated from to the sol in the vessel, a density difference is induced in the sol or sol convection occurs. Consequently when the temperature difference is eliminated, the rates of aggregation and polymerization of colloidal particles become uniform, yielding a homogeneous gel skeleton. The resulting homogeneous gel skeleton yields a final product or glass substantially free from a stria form of defects. It is thus ideally desired that, at least until gelation, a gelation atmosphere be kept constant at a temperature equal to the temperature of the sol.

A sol is produced by the hydrolysis reaction, etc. of metal alkoxides, and, therefore, is kept at a high temperature due to the heat of the reactions. When this sol is charged in a gelation vessel having an ambient temperature, there is a difference between the temperature of the sol charged in the gelation vessel and the temperature of the gelation vessel. To make the temperature of the sol equal to that of the gelation vessel, it is required to regulate the temperature of the sol or vessel. For gelation, the vessel with the sol charged therein may be placed on this equal temperature.

It is preferable that the temperature of the sol be equal to that of the gelation vessel. However, if the difference between the temperature of the sol and the temperature of the gelation vessel is controlled such that the sol does not substantially flow, the resulting glass is then free from a stria form of defects; no problem arises if the temperature difference between the sol and the gelation vessel lies within a range of 7° C.

Even when the difference between the sol temperature and the gelation temperature is small, the sol flows with vibrations applied to the gelation atmosphere; consequently, some density distribution is imparted to the sol, giving rise to a stria form of defects. On the other hand, if the sol is gelated upon being charged in the gelation vessel while the sol is kept in a stationary state i.e., without vibrations being applied thereto, the gel skeleton density then becomes uniform, yielding a final product or glass free from a stria form of defects.

At the gelation step of the sol, the viscosity of the sol is initially 0.01 to 0.02 poises, and as the polycondensation reaction proceeds, the sol is gelated at 100 to 10,000 poises. So long as the viscosity of the sol remains low, the sol is kept in a uniform state, even when temperature differences and vibrations are applied thereto, and so the sol convects. It is not always necessary to avoid application of temperature differences and vibrations to the sol just after the sol is charged in the gelation vessel to prevent the gel skeleton from becoming locally coarse. However, when the viscosity of the sol becomes higher than 1 poise as a result of the progress of gelation, neither if temperature differences nor vibrations are applied to the sol, the formation of a locally coarse gel skeleton is avoided, and it is then possible to obtain a final product or glass free from a stria form of defects. More preferably, when the viscosity of the sol becomes higher than 0.1 poise, if neither temperature difference nor vibrations are applied to the sol, the formation of a locally coarse gel skeleton is avoided, and it is then possible to obtain a final product or glass that is of high quality but free from a stria form of defects.

Even when colloidal particles have a density difference, for instance, even when there is a temperature difference between the sol and the gel, or vibrations are applied to the sol, it is possible to keep the sol in a uniform state by stirring the sol in the gelation vessel by suitable stirring means such as irradiation with ultrasonic waves, agitators, blades, and bubbling.

The glass production method of the present invention by the sol-gel technique is applicable to the production of not only homogeneous glasses but also gradient index glasses, and yields glass products from which a stria form of defects are substantially eliminated. When a homogeneous glass with striae induced therein is produced, stria-free portions may be cut out of the glass. In the case of a gradient index glass, however, it is difficult to cut stria-free portions out of that glass. Thus, since the present invention is capable of substantially eliminating a stria form of defects, the present invention is more advantageously applicable to making gradient index glasses of high quality in high yields.

The present invention will now be explained at great length with reference to some examples. In the following examples, the ratio of mixed solvents is given by volume.

EXAMPLE 1

Fifty (50) ml of tetramethoxysilane were mixed with 50 ml of tetraethoxysilane, and 42 ml of 1/100N hydrochloric acid were added to the mixture under a 1-hour agitation at room temperature for partial hydrolysis. The obtained solution was vigorously stirred for 10 minutes together with a mixed solution of 189 ml of 1.25 mol/l of an aqueous solution of acetic acid with 26 ml of acetic acid to prepare a sol. After being allowed to stand alone for 5 minutes, the sol was found (by measurement) to have a temperature of 29° C. A given amount of this sol was charged in a fluorocarbon resin gelation vessel having an internal diameter of 50 mm and pre-maintained at 29° C. for gelation.

The obtained gel was immersed in 0.61 mol/l of a lead acetate solution prepared using an 8:2 mixed solvent of isopropanol and water at 60° C. for removal of acetic acid, and gel aging. The gel was immersed in isopropanol, an 8:2 mixed solvent of isopropanol and acetone, a 5:5 mixed solvent of isopropanol and acetone, and acetone in this order for 24 hours per solvent, thereby precipitating and fixing lead acetate crystallites in gel pores. The drying and firing of this gel gave a glass product of about 20 mm in diameter, with neither a stria form of defects nor cracks induced therein.

EXAMPLE 2

A given amount of a sol of 29° C. prepared as in Example 1 was quietly charged in a fluorocarbon resin gelation vessel having an internal diameter of 50 mm, gelated in a thermostatic bath of 30° C., and allowed to stand alone for an additional three days for aging.

The obtained gel of 30 mm in diameter was brought into contact with 0.61 mol/l of a lead acetate solution prepared using an 8:2 mixed solvent of isopropanol and water at 60° C. for removal of acetic acid, and gel aging. This gel was brought into contact with isopropanol, an 8:2 mixed solvent of isopropanol and acetone, a 5:5 mixed solvent of isopropanol and acetone, and acetone in this order for 24 hours per solvent, thereby precipitating and fixing lead acetate crystallites in gel pores.

Then, the obtained homogeneous gel was immersed for 20 minutes in a solution prepared by mixing ethanol solutions of 0.305 mol/l of potassium acetate and 0.153 mol/l of acetic acid to impart a concentration distribution thereto. In this way, a convex distribution was imparted to the lead component, and a concave distribution to the potassium component. To fix the concentration distribution, this gel was immersed in isopropanol, an 8:2 mixed solvent of isopropanol and acetone, a 5:5 mixed solvent of isopropanol and acetone, and acetone in this order for 6 hours per solvent.

This gel was dried at 30° C. for 3 days, and then heated to 570° C. for sintering. As a result, a colorless and transparent glass product of 18 mm in diameter was obtained, which was found to have no cracks therein. The glass product was also found to have a refractive index distribution in which its refractive index decreases monotonously from the center to the periphery, and no stria form of defects induced therein.

Comparative Example 1

A given amount of a sol of 29° C. prepared as in Example 1 was quietly charged in a fluorocarbon resin gelation vessel having a 50 mm internal diameter, and gelated in a thermostatic bath of 10° C. This gel was treated as in Example 1, dried, and fired into a glass. However, this glass was found to have a stria form of defects induced therein.

Comparative Example 2

A given amount of a sol of 29° C. prepared as in Example 1 was quietly charged in a fluorocarbon resin gelation vessel having a 50 mm internal diameter, and gelated in a thermostatic bath of 50° C. This gel was treated as in Example 1, dried, and fired into a glass. However, this glass was found to have numerous stria defects induced therein.

Comparative Example 3

A given amount of a sol of 29° C. prepared as in Example 1 was quietly charged in a fluorocarbon resin gelation vessel having a 50 mm internal diameter, and gelated in a thermostatic bath of 40° C. This gel was treated as in Example 1, dried, and fired into a glass. This glass was again found to have stria defects induced therein, although the number of defects was smaller than that induced by gelation in the thermostatic bath of 50° C.

Comparative Example 4

A given amount of a sol of 29° C. prepared as in Example 1 was quietly charged in a fluorocarbon resin gelation vessel having a 50 mm internal diameter, and gelated in a thermostatic bath of 10° C. This gel was treated as in Example 2, dried, and fired into a glass. This glass was found to have a refractive index distribution in which its refractive index decreases monotonously and roughly from the center to the periphery, but a stria form of defects were found therein. An equivalent refractive index line indicating a diametrical refractive index distribution did not take any true conical form.

Comparative Example 5

A given amount of a sol of 29° C. prepared as in Example 1 was charged in a fluorocarbon resin gelation vessel having an internal diameter of 50 mm and pre-maintained at 29° C., and gelated while vibrations were applied thereto using a dental vibrator (JM Vibrator made by Fujiwara Shika Sangyo Co., Ltd.). This gel was treated as in Example 1, dried, and fired into a glass. However, a stria form of defects were found in this glass.

Example 3

Tetraethoxysilane, ethanol, and 2N hydrochloric acid were mixed together for partial hydrolysis of silicon alkoxide. The product was stirred for 1 hour together with a solution of zirconium tetraisopropoxide in isopropanol. Subsequently, the solution was cooled down to 10° C., followed by the dropwise addition thereto of a mixed solution consisting of sodium nitrate, water, isopropanol, dimethylformamide, and ammonia water for sol preparation. The temperature of this sol was 10° C. A given amount of the sol was charged in a fluorocarbon resin gelation vessel having an internal diameter of 4 mm and pre-maintained at 5° C., gelated in a thermostatic bath of 12° C., and allowed to stand alone for an additional three days for aging.

The obtained gel was immersed in 3N sulfuric acid for 30 minutes, and then dipped in isopropanol for the fixation of distribution. The drying, and sintering of this gel gave a colorless and transparent glass product having a diameter of 1.6 mm, which was found to have neither cracks nor a stria form of defects therein. The glass product was also found to have a diametrical refractive index distribution in a parabolic form.

As can be understood from the foregoing, high-quality glass products with no stria form of defects induced therein can be easily produced by imparting no density distribution to sols at the gelation step.

What I claim:

1. A method for producing a glass by a sol-gel technique, said method comprising the steps of:

charging a prepared sol in a gelation vessel, the gelation vessel having a temperature that is less than 7° C. different from a temperature at which the prepared gel is charged into the gelation vessel;

preparing a wet gel by gelling the prepared sol while maintaining the gelation vessel free of vibration, once a viscosity of the prepared sol is higher than 1 poise, to maintain colloidal particles in the prepared sol at a uniform density; and drying and firing the wet gel for vitrification.

2. The glass production method of claim 1, wherein a difference between a gelation temperature and the temperature of the sol as charged in a gelation vessel is smaller than 7° C.

3. The glass production method of claim 1, wherein said gelling step comprises maintaining a temperature difference across the prepared sol small enough to prevent internal convection of the prepared sol.

4. The glass production method of claim 1, wherein said gelling step comprises maintaining a temperature difference across the prepared sol small enough to prevent an internal density distribution from being imparted to the prepared sol.

5. The glass production method of claim 1, further comprising stirring the prepared sol in the gelation vessel with stirring means so that the prepared sol is kept in a uniform state.

6. A method producing a glass by a sol-gel technique, said method comprising the steps of:

charging a prepared sol in a gelation vessel, the gelation vessel having a temperature that is less than 7° C. different from a temperature at which the prepared gel is charged into the gelation vessel;

preparing a wet gel by gelling the prepared sol while maintaining the gelation vessel free of vibration, at least after a viscosity of the prepared sol is higher than 0.1 poise, to maintain colloidal particles in the prepared sol at a uniform density; and drying and firing the wet gel for vitrification.

7. The glass production method of claim 1, wherein the prepared sol has been prepared by hydrolyzing a metal alkoxide.

* * * * *